April 12, 1966 P. W. CLARKE 3,246,231
FREQUENCY CONVERSION SYSTEM UTILIZING CONTROLLED
FREQUENCY FEEDBACK
Filed Nov. 10, 1961 4 Sheets-Sheet 1
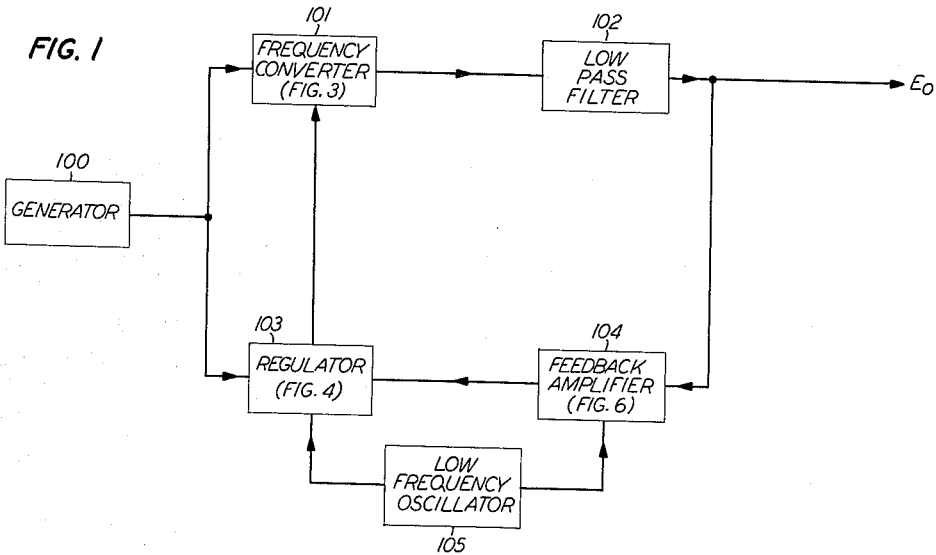
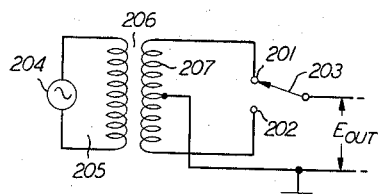
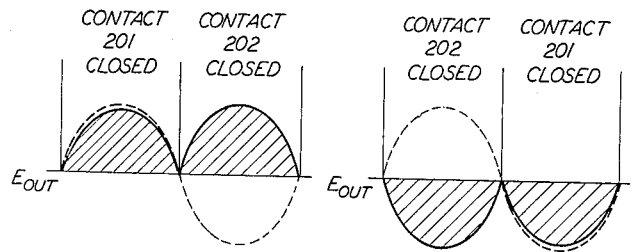
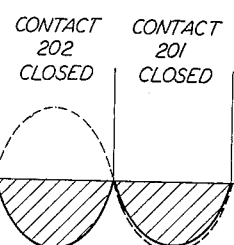
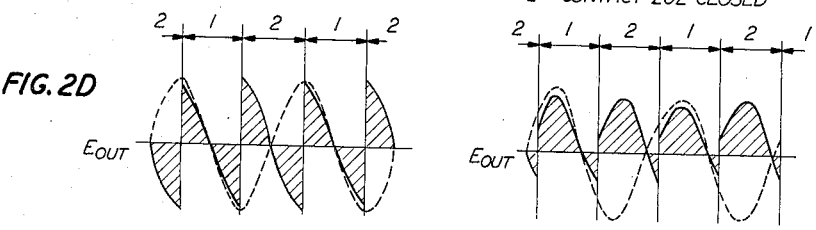
INVENTOR
P. W. CLARKE
BY
*George C. Ford*
ATTORNEY April 12, 1966 P. W. CLARKE 3,246,231
FREQUENCY CONVERSION SYSTEM UTILIZING CONTROLLED
FREQUENCY FEEDBACK
Filed Nov. 10, 1961 4 Sheets-Sheet 2

INVENTOR
P. W. CLARKE
BY
ATTORNEY

April 12, 1966  P. W. CLARKE  3,246,231
FREQUENCY CONVERSION SYSTEM UTILIZING CONTROLLED
FREQUENCY FEEDBACK
Filed Nov. 10, 1961  4 Sheets-Sheet 3

INVENTOR
P. W. CLARKE
BY
ATTORNEY

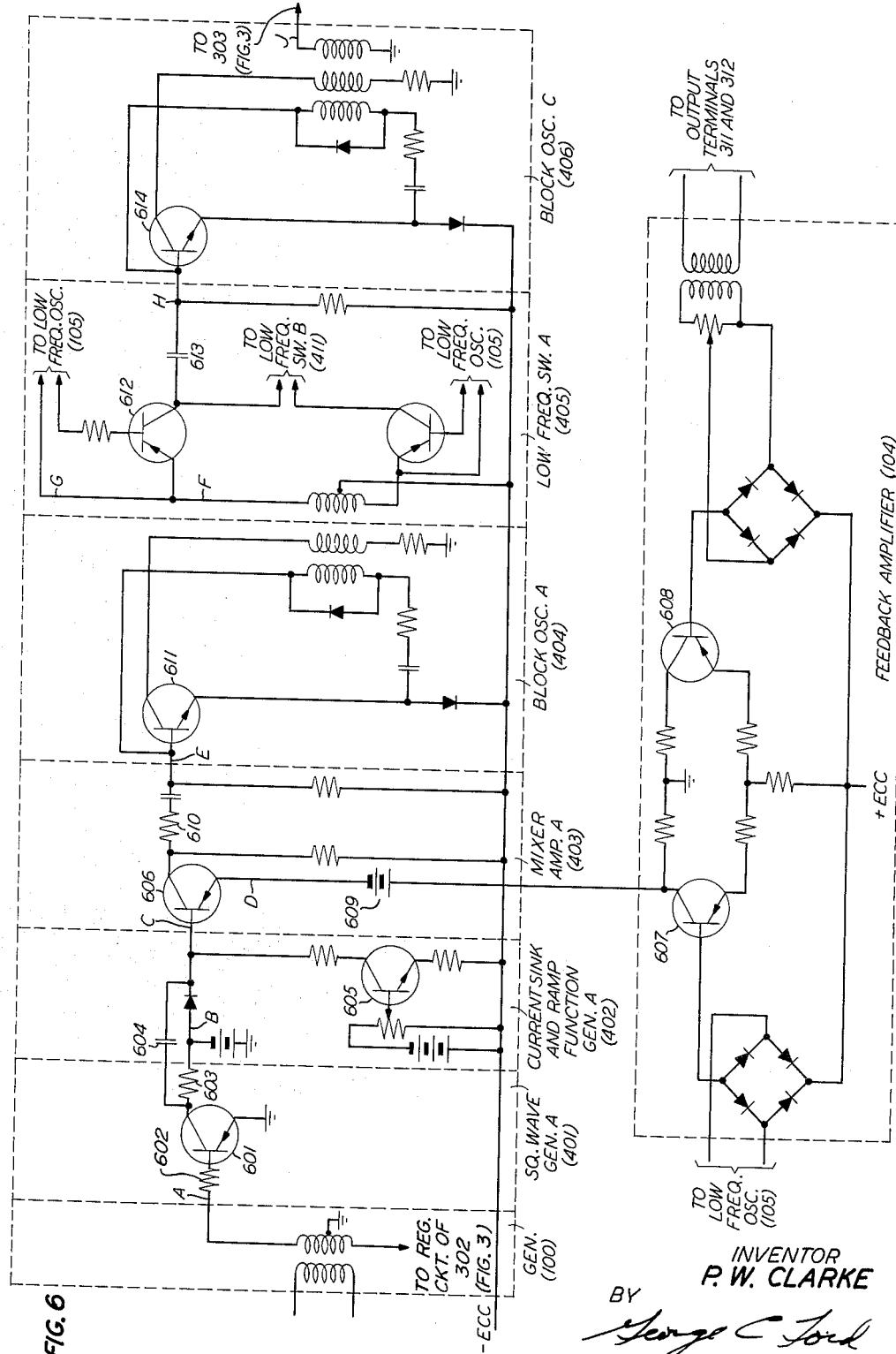

United States Patent Office 3,246,231
Patented Apr. 12, 1966

3,246,231
FREQUENCY CONVERSION SYSTEM UTILIZING CONTROLLED FREQUENCY FEEDBACK
Patrick W. Clarke, Jackson Heights, N.Y., assignor to Bell Telephone Laboratories, Incorporated, New York, N.Y., a corporation of New York
Filed Nov. 10, 1961, Ser. No. 151,573
6 Claims. (Cl. 321—69)

This invention relates to frequency conversion systems and more particularly to solid state feedback controlled frequency conversion systems.

Where it is necessary to obtain a source of low frequency both in the event of a commercial power failure or where commercial power is not available, gas turbine or diesel driven alternators are employed. Diesel driven alternators are preferred to gas turbine driven alternators for applications where frequency stability is an important consideration because of their ability to operate at shaft speeds which may be mechanically governed to control output frequency. The physical size of a diesel engine is, however, many times larger than that of a gas turbine, hence they are less desirable for applications where space is at a premium. New problems arise with the smaller gas turbines in that they operate at speeds too high for directly coupling the shaft to a low frequency alternator. Customary solutions to the gas turbine coupling problem involve either reduction gears or hydraulic speed reduction devices, the outputs of which are then coupled to the low frequency alternator. Both arrangements are cumbersome and expensive. The gear reduction method also requires governing the turbine speed, which is a serious disadvantage since optimum efficiency of the turbine system requires that the speed of the turbine be permitted to vary with the load. A constant frequency output can, therefore, only be obtained by sacrificing efficiency.

Regardless of the mechanical systems employed, the frequency output of both the diesel and gas turbine system is still relatively variable with a large harmonic content distorted wave shape. As a result, filter components as large as an oversized desk are required to obtain the desired frequency output. The speeds, hence the high frequency output of the diesel and gas turbine systems, are also limited by the mechanical parameters. One can easily imagine the tremendous cost, space, and maintenance problems involved in such systems when the physical sizes of the filtering components, the alternators, the driving diesel or gas turbine and associated coupling equipment are considered.

Other approaches to the problem have involved the use of thyratron and similar electronic circuitry. Such schemes have been found to have disadvantages such as poor output wave form and regulation, complexity, unreliability, excessive filtering, necessity of utilizing some of the output power as a power source for the conversion components and the like. The disadvantages of these systems are attested to by the fact that mechanical systems are still being employed for most new applications.

A major problem which has plagued both the mechanical and electronic systems has been the current and voltage phase shift inherently involved when inductive or nonlinear loads are supplied. Since the output current and voltage are of a different polarity for a portion of each cycle (hence their "zero crossings" are different), the response of the control circuitry involved is inherently and necessarily slow. This in turn limits the frequencies involved, causes the output voltage to vary, and indirectly leads to considerable harmonic distortion of the fundamental frequency wave form.

An object of this invention is, therefore, to obtain a solid state electronic frequency converter which does not require any mechanical parts.

A closely related object is to do so with the smallest physical system possible and at the same time achieve the advantages of simplicity, low cost, and reliability.

Another closely related object is to obtain an electronic frequency converter with a feedback controlled frequency and wave form output which requires only a minimal amount of filtering.

The present invention is a solid state, pulse duration modulation system which converts an unregulated source of single or polyphase high frequency power to a lower single or polyphase frequency output which is simultaneously fed back and regulated for voltage and wave form output. Small conventional filter chokes may be utilized to collaterally facilitate selection of harmonic content.

In accordance with a feature of the present invention controlled rectifiers (pnpn devices described for example in the paper, "A Silicon Controlled Rectifier—Its Characteristics and Ratings—I," D. K. Bisson and R. F. Dyer, Paper 58–1248, American Institute of Electrical Engineers) in a single or multiphase system are "gated" by low frequency "gated" high frequency pulses such that a resultant wave form comprising high and low frequency components is produced. The low frequency components, which include only the fundamental and third harmonics, may be filtered from the resultant wave form. Since all other low frequency harmonics are effectively eliminated, greater efficiency and wave form purity are obtained. By employing a direct current to high frequency alternating-current inverter as the input source of high frequency, it is possible to obtain a completely solid state, battery operated system which may be designed for the optimum combination of efficiency, size, weight, wave shape, output voltage and number of phases.

In accordance with another feature of the present invention "capacitor commutation" and "unilateral and bilateral symmetric" switching techniques are both used to "turn-off" the controlled rectifier, thus extending the frequency capability of the system and eliminating the heretofore adverse effects of inductive or nonlinear loads on such systems. "Capacitor commutation" refers to an arrangement for charging two capacitors to a potential which is approximately half the potential required to "turn-off" an "on" controlled rectifier. The sum of the potentials stored in each capacitor is applied to the "on" controlled rectifier to turn it "off" by the "off" controlled rectifier which is "gated-on." In this manner the controlled rectifiers are "turned-off" in the least possible time. The "symmetric" switching techniques comprise an asymmetrically conducting device bridge circuit with one set of vertices connected between the source and the load while the regulating controlled rectifier is connected to the other set of vertices. The bridge circuit provides a current path through the controlled rectifier whenever it is conductive regardless of the relative polarities of the source and the load. The adverse effects of the current being of one polarity and the voltage of another for a portion of each cycle when inductive or nonlinear loads are supplied are thus eliminated.

Other objects and features of the present invention will become apparent upon consideration of the following detailed description when taken in connection with the accompanying drawing in which:

FIG. 1 is an over-all block diagram of the invention;

FIG. 2 is illustrative of the basic principles of the invention as discussed hereinafter;

FIG. 6 is the circuitry of one group of "blocks" of FIG. 4.

Figure 3:
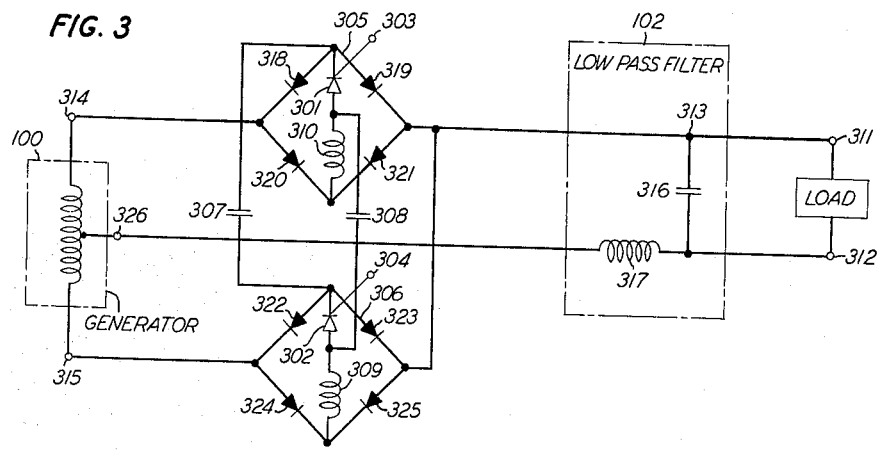
FIG. 3 is the circuitry of the frequency converter and low pass filter boxes of FIG. 1.

It should be noted that the first digit of each component in each drawing corresponds to the figure number wherein that component made its first appearance.

The overall frequency conversion system is shown in FIG. 1. The input generator 100 is connected to the frequency converter 101 and the regulator 103. A low-pass filter 102 is connected to the output of the frequency converter 101. A feedback signal is fed from the output of the low-pass filter 102 to the feedback amplifier 104 where it is combined with an input from the low frequency oscillator 105 and fed into the regulator 103. The feedback signal, a signal from the low frequency oscillator 105, and the signal from the generator 100 are combined by the regulator 103 and the resultant signal is fed to the frequency converter 101. The details of this operation are described at length hereinafter.

The general operation of the frequency converter will best be understood by referring to the sketches shown on FIG. 2. FIG. 2a shows an alternating-current source 204, a transformer 206 with primary winding 205 and a center tapped secondary winding 207. A single-pole, double-throw switch has circuit terminals 201 and 202 and a common terminal 203. The output is taken between terminal 203 and the center tap of secondary winding 207.

Assuming that the polarity of the voltage induced at the top of winding 207 is positive, it is easily seen that this positive potential will appear across circuit terminal 201 and common terminal 203 if the switch is in the position shown. The dotted positive half cycle of FIG. 2b shows the input voltage when the switch is in this position while the shaded area represents the volt-second output. If the switch is changed to terminal 202 when the alternating-current signal across the zero axis in the negative direction, as shown by the dotted negative half cycle (such that the top of winding 207 is negative while the bottom is positive), the negative half cycle volt-second output will appear as the shaded area shown in FIG. 2b. It should be noted that, as in the example, if the switching frequency of the switch is synchronized in phase with the output frequency, a positive volt-second output will be obtained as is easily seen from FIG. 2b. FIG. 2c shows the volt-second output when the frequency of the switch is the same as the frequency of the input but is 180 degrees out-of-phase with the input frequency. As can be seen from FIG. 2c, a negative volt-second output will be obtained with this out-of-phase synchronization. FIG. 2d illustrates the volt-second output when the frequency of the input is the same as the switching frequency except that the switch frequency is 90 degrees out-of-phase with the input frequency. Note that the resultant output here is zero since the positive and negative volt-second areas cancel over the two cycles shown. FIG. 2e represents an example where the input and switching frequencies are again equal and the phase shift is less than 90 degrees. The resultant distorted wave form will be a function of the input and modulating (switching) frequencies out of which the desired frequency may be easily filtered. Although for illustrative purposes these frequencies were made equal in FIGS. 2b, 2c, 2d, and 2e, the effects of using a low frequency switching rate with a higher frequency input should be somewhat apparent. Such an output may be expressed mathematically but since the process is rather complex, it is omitted here for the sake of brevity. It should be additionally apparent that voltage regulation may be achieved merely by controlling the phase shift of the modulating function.

The circuitry of the frequency converter box of 101 of FIG. 1 is shown in FIG. 3. The controlled rectifiers 301 and 302 in combination with asymmetrically conducting device bridges 305 and 306, respectively, are substituted for switch contacts 201 and 202 of FIG. 2. Terminal 313 corresponds to terminal 203 of FIG. 2. Input terminal 314 is connected to one vertex of full wave asymmetrically conducting device bridge 305 which comprises asymmetrically conducting devices 318, 319, 320, and 321, while input terminal 315 is connected to one vertex of full wave asymmetrically conducting device bridge 306 which comprises asymmetrically conducting devices 322, 323, 324, and 325. Another vertex of asymmetrically conducting device bridge 305 is connected to output terminal 311 while another vertex of asymmetrically conducting device bridge 306 is connected to the same terminal. Common input terminal 326 is connected to filter choke 317 which is in turn connected to output terminal 312. Filter capacitor 316 is connected across output terminals 311 and 312. Controlled rectifier 301 and inductor 310 are serially connected to the remaining two vertices of asymmetrically conducting device bridge 305. Controlled rectifier 302 and inductor 309 are connected to the remaining two vertices of asymmetrically conducting device bridge 306. Capacitor 307 is connected from one vertex of asymmetrically conducting device bridge 305 to the corresponding vertex of asymmetrically conducting device bridge 306. Capacitor 308 connects the juncture of controlled rectifier 301 and inductor 310 to the juncture of controlled rectifier 302 and inductor 309. The "gate" leads 303 and 304 of controlled rectifiers 301 and 302 are connected to the output of blocking oscillators C (406) and D (412), respectively, the latter of which are shown on FIGS. 4 and 6. Filter inductor 317 and capacitor 316 form the low-pass filter 102.

The configuration of FIG. 3 is a single phase converter circuit. The controlled rectifiers 301 and 302 with associated asymmetrically conducting device bridges 305 and 306 form a bilateral symmetric switch arrangement. The bilateral switch is a basic building block; multiple units may be connected to a multiphase generator to produce a single or multiphase output. Although it will become obvious from the following discussion, it should be noted at this point that a "unilateral symmetrical" switching arrangement with appropriate filtering and "turn-off" means could be used in a single phase conversion system.

Conduction through either controlled rectifier 301 or 302 begins when a positive potential is applied at one of the "gate" leads 303 or 304 for a sufficient period of time. It should be noted that although current will flow in only one direction through the controlled rectifiers 301 and 302 when one or the other is biased "on," the asymmetrically conducting device bridges 305 and 306 permit this unidirectional current flow to be sustained regardless of the relative polarities of the potentials at points 313, 314, and 315. This is an important consideration when reactive or nonlinear loads are connected to terminals 311 and 312. For example, when a reactive load is connected to terminals 311 and 312, the low frequency voltage and current are of opposite polarity for a portion of each cycle (the "zero crossings" occur at different times in the cycle). As noted heretofore, this situation caused the control systems of the prior art to be inherently and necessarily slow, i.e., the current and voltage had to both be in the positive or negative regions before the devices involved could operate thus introducing a time delay equal to the phase shift. As discussed hereinafter, the "zero crossing" of the low frequency voltage is controlled by the regulator 103 circuit and occurs when the frequency converter circuit 101 is switched between in-phase and out-of-phase synchronization. The regulator circuit 103 does not take cognizance of the "zero crossing" of the low frequency current wave shape, the theory being that the load when supplied with a voltage of the proper wave shape is now free to determine the desired current wave shape. The asymmetrically conducting device bridge circuits 305 and 306, as discussed above, eliminate the problem caused by the fact that the current wave shape is in the negative region while the voltage wave shape is in the positive region.

The upper frequency of operation of the converter of FIG. 3 is optimum, being limited only by the characteristics of the controlled rectifiers 301 and 302. Such a system has, therefore, a considerably higher upper frequency output limit than the mechanically limited systems of the prior art. This is due to the fact that "capacitor commutation" is being used as an effective means of switching the pnpn devices. The operation of the "capacitor commutation" turn-off network can best be understood by assuming that the point 314 is positive, point 315 is negative and that controlled rectifier 301 is "gated-on." Capacitor 307 charges through asymmetrically conducting devices 320 and 322, inductor 310 and controlled rectifier 301 to a potential which is approximately half the required "turn-off" potential of the controlled rectifiers. When the polarity of the voltage input reverses such that point 314 is negative while point 315 is positive, capacitor 308 charges through asymmetrically conducting devices 324 and 318, controlled rectifier 301 and inductor 309 also to a potential which is approximately half the required turn-off potential of the controlled rectifiers. It should be noted that there is no appreciable discharge path for capacitor 307 during the period of time that it takes capacitor 308 to charge. As soon as controlled rectifier 302 is "gated-on" (in a manner discussed hereinafter), however, the sum of the potentials stored in capacitors 307 and 308 appears across controlled rectifier 301 thus turning it "off." In a similar manner, controlled rectifier 302 is commutated when controlled rectifier 301 is "turned on." Inductors 309 and 310 insure that the capacitors 307 and 308 do not discharge too rapidly, i.e., discharge before the potential across the controlled rectifier has been applied for a sufficient time to turn the controlled rectifier "off."

The filter inductor 317 is assumed large enough (above the critical inductance) such that the energy stored in it is sufficient to force the "on" controlled rectifier to remain "on" until the other controlled rectifier is pulsed "on." This assumption permits pulsed firing of the controlled rectifiers rather than requiring a continuous gate signal to the "on" device. Applying such a continuous gate signal could, however, be easily accomplished by the system of this invention if so desired as shall be easily seen in the discussion of FIG. 6 hereinafter. Inductor 317 comprises part of the low pass filter 102 while capacitor 316 is the other part. Since the low frequency harmonic content of this system is small the filtering is largely a function of the generator frequency hence for most applications filtering at a high frequency level is all that is required to obtain a low frequency output.

Figure 4:
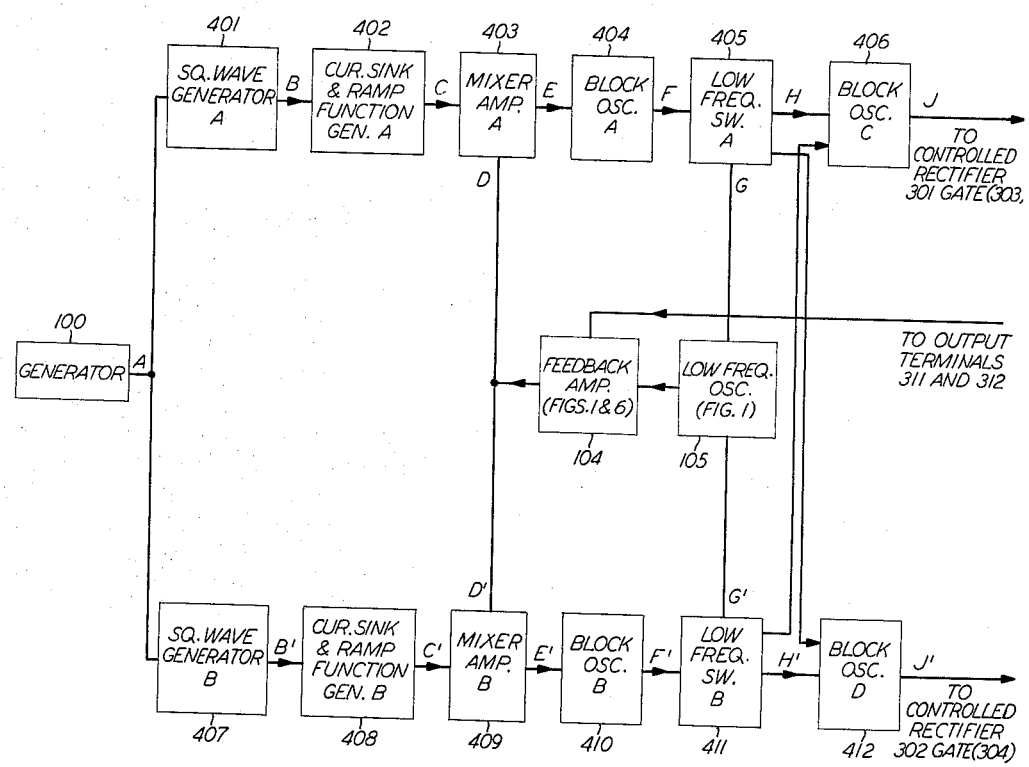
FIG. 4 is a block diagram of the regulator box of FIG. 1.

FIG. 4 shows a block diagram of the regulator circuit which produces the controlled rectifier gate pulses noted heretofore. The wave shapes at various points on one group of "blocks" of the two group complementary network shown in FIG. 4 as capital letters correspond to the wave forms of FIG. 5. The circuitry of each of the boxes of one group of the two group complementary network of FIG. 4 is shown in FIG. 6 and shall be discussed hereinafter. As shown by wave shape A in FIG. 5, a sine wave input from generator 100 is fed into the conventional square wave generator A (401) and the output is the customary square wave as shown by wave shape B of FIG. 5. It should be noted for reasons which will become apparent hereinafter, that the positive output of the square wave generator A (401) occurs only when the sine wave shape A, is positive. Square wave shape B is fed into current sink and ramp function generator A (402), the output of which is a linear time function, i.e., a ramp, as shown by wave shape C. Feedback amplifier 104 establishes the direct-current biasing level of mixer amplifier A (403) as shown by the level D in FIG. 5. The mixer amplifier A (403) conducts at the point that the biasing level D "hits" the linear time function C to bias mixer amplifier A (403) into conduction which, in turn, yields a "trigger" output E delayed by the length of time T it took the linear time function C to reach the direct-current biasing level D. It is easily seen that by controlling the magnitude of the direct-current biasing level D, the period of time T may be easily controlled. It should be noted at this point that the magnitude of the direct-current biasing level D is a function of the frequency of the low frequency oscillator 105 and the output voltage appearing at the terminals 311 and 312. Thus, the high frequency information of the linear time function is combined with a portion of the output voltage and the low frequency modulating signal (wave shape G) by the mixer amplifier A (403). Blocking oscillator A (404) shapes the trigger pulses E to the square pulses F. Low frequency switch A (405) passes the pulses F to blocking oscillator C during the positive half cycle of "gating" wave shape G, thus yielding the narrow pulses shown by wave shape H. During the negative half cycle of "gating" wave shape G pulses F′ are passed to blocking oscillator C. The low frequency switch 405 is thus used to direct the pulse train to the controlled rectifier 301 in proper sequence to synthesize the positive and negative half cycle of the low frequency output. Blocking oscillator C (406) shapes the square pulses H into square pulses J with a larger magnitude. The pulses J are fed to the "gate" lead 303 of the controlled rectifier 301 to fire the controlled rectifier at the proper times.

Figure 5:
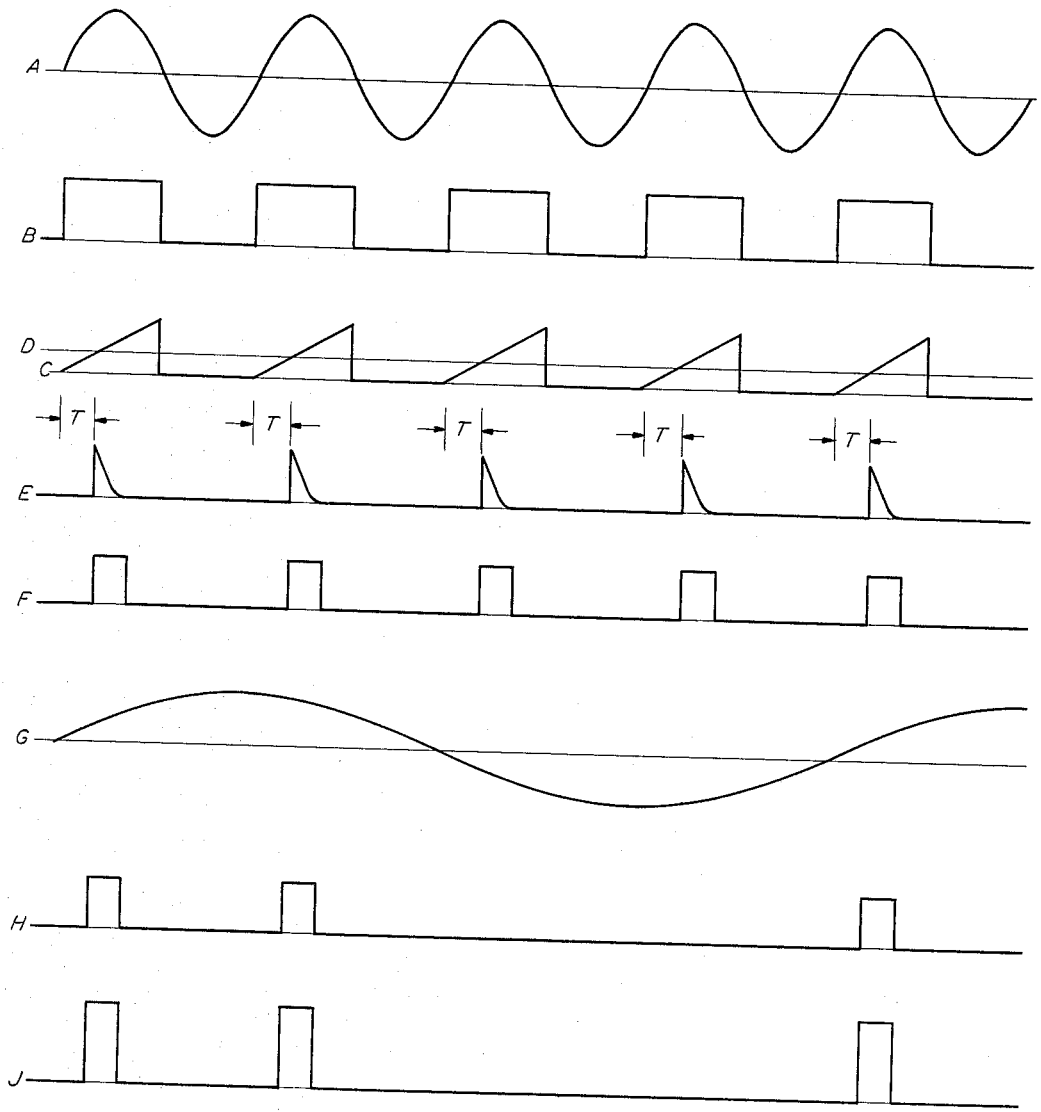
FIG. 5 is illustrative of the wave forms at points noted on FIGS. 4 and 6.

The wave shapes A′, B′, C′, E′, and F′ of FIG. 5 are identical to the wave shapes A, B, C, E, and F at the points noted in FIG. 4 except that they are 180 degrees out-of-phase with the wave shapes shown. For the sake of brevity they are not, therefore, shown in FIG. 5. The square wave output B′ will occur when the wave shape A is negative. Each of the wave shapes C′, E′, and F′ is then the same as C, E, and F except for the 180-degree phase, hence time, difference.

For illustrative purposes only, one embodiment of the circuitry of each of the boxes in the regulator circuit for controlled rectifier 301 is shown in FIG. 6. Since the regulator circuitry of controlled rectifier 302 is identical to that of controlled rectifier 301, it is omitted from FIG. 6 for clarity. It should be understood that these embodiments serve only illustrative purposes and that the prior art is abundant in equivalent structures. The operation of the circuit of FIG. 6 is as follows: Wave shape A as shown in FIG. 5 is applied to the base electrode of transistor 601 through base current limiting resistor 602. Transistor 601 is an over-driven amplifier which operates in half cycles of the high frequency signal A. The wave shape appearing on resistor 603 is shown as B on FIG. 5. This voltage is applied to capacitor 604 through current sink 605 resulting in a ramp function output applied at the base of transistor 606 as shown by wave shape C. The slope of the ramp function may be adjusted by changing the current level of the current sink 605.

Differential feedback amplifier 104 is comprised of transistors 607 and 608. Input signal applied to the base of transistor 607 is a constant which is derived for convenience from the low frequency oscillator 105. It should be apparent that any biasing means would be sufficient. The input signal applied to the base of transistor 608 is a function of the potential appearing across output terminals 311 and 312. The potential appearing at the collector of transistor 607 is a function of the difference of potential of a portion of the load and low-frequency oscillator potentials which in combination with direct-current source 609 establishes bias potential of mixer amplifier 606. The length of time T it takes to bias mixer amplifier transistor 606 into conduction determines the time delay of the pulses which are in turn differentiated by RC network 610 and fed into the base of blocking oscillator transistor 611 as "trigger" pulses. The pulses appearing at the base of transistor 611 are shown on FIG. 5 as wave shape E. It should be noted that at this point (mixer amplifier A) the high frequency signal has been modulated by a low frequency signal which is the difference between the low frequency oscillator and a portion of the output frequency signals. Since the output frequency is thus controlled, the only evidence of change of load would be a shift in the output voltage harmonics with no change in the fundamental frequency. The feedback technique, however, tends to eliminate output voltage variations and, in addition, minimizes the harmonic content in the output due to changes of load. Collaterally, the amount of output filtering required is reduced. Although the feedback in the present system greatly improves the overall characteristics of the system it should be obvious that the system could function without feedback. It should be noted that the modulating function is chosen to produce a large component of the output voltage at the desired frequency component in the spectrum. If the generator frequency is four times greater than the output frequency, relatively little or no filtering is required at the output frequency level to produce a low frequency sinusoidal wave shape.

Returning to the circuitry of FIG. 6, we see that the output of blocking oscillator 404 appears as a square wave at the emitter of low frequency switching transistor 612. Since the base-emitter junctions of transistor 612 are connected to the low frequency oscillator 105, the transistor conducts only during positive excursions of the wave shape G. When transistor 612 is conducting, the pulses of wave shape F pass as seen by wave shape H. Capacitor 613 is a coupling capacitor. The pulses of wave shape H are fed to the base of pulse forming blocking oscillator transistor 614. The output of blocking oscillator C (406) appears on the "gate" lead 303 of controlled rectifier 301 as shown by wave shape J. The output J of the complementary regulator network is applied to the "gate" lead 304 of controlled rectifier 302. It should be noted that the blocking oscillators A (404), B (410), C (406), and D (412) are used merely for pulse shaping purposes in the preferred embodiment shown and could be eliminated, if so desired, for any given application.

Thus controlled rectifiers 301 and 302 are switched in accordance with a high frequency signal modulated by a time delayed low frequency signal which is the combination of a reference and a feedback signal. The low frequency switches direct the pulse trains to the controlled rectifier devices in proper sequence to synthesize the positive and negative half cycles of the output. The output signal is filtered to obtain the desired low frequency component. The third harmonic of this low frequency component which is very strong may also be filtered. Since all other harmonics are effectively eliminated, greater efficiency and wave form purity are achieved. It should be noted that the converter can be made to function in either in-phase or out-of-phase synchronization by connecting the proper controlled rectifier to the proper pulse source.

It should be additionally noted that in the system described heretofore a direct-current to high frequency alternating-current inverter could be substituted for the generator 100. Any of a large variety of inverters which are common to the prior art could be employed. Either transistors or controlled rectifiers could be used as the active elements. Such a system would be a completely solid state, battery operated system which could be designed for the optimum combination of efficiency, size, weight, wave shape, output voltage and number of phases. It need not be regulated or filtered. A high frequency auxiliary output can be obtained from the inverter while the present system is used to convert, regulate and shape the wave form of a low frequency output.

Since changes may be made in the above-described arrangements and different embodiments may be devised by those skilled in the art without departing from the spirit and scope of the invention, it is to be understood that all matter contained in the foregoing description and accompanying drawings is illustrative of the application of the principles of the invention and is not to be construed in a limiting sense.

What is claimed is:

1. A frequency conversion system comprising first and second control rectifiers each having anode, cathode, and control electrodes, a source of alternating-current having first, second and common terminals, first and second asymmetrically conducting device bridge circuits each having first and second sets of vertices, first and second inductors, a load having first and second terminals, a filter inductor, a filter capacitor, first and second capacitors, means for serially connecting the anode and cathode electrodes of said first controlled rectifier and said first inductor to the first set of said vertices of said first bridge circuit, means for serially connecting the anode and cathode electrodes of said second controlled rectifier and said second inductor to the first set of said vertices of said second bridge circuit, means for serially connecting the second set of said vertices of said first bridge circuit between the first terminal of said alternating-current source and the first terminal of said load, means for serially connecting the second set of said vertices of said second bridge circuit between the second terminal of said alternating-current source and the first terminal of said load, means for connecting said filter inductor between the common terminal of said alternating-current source and the second terminal of said load, means for connecting said filter capacitor across said load, means for connecting said first capacitor from the anode electrode of said first controlled rectifier to the anode electrode of said second controlled rectifier, means for connecting said second capacitor from the cathode electrode of said first controlled rectifier to the cathode electrode of said second controlled rectifier, means for regulating the state of conduction of said first and second controlled rectifiers having first and second terminals, means for connecting the control electrode of said first controlled rectifier to the first terminal of said state of conduction regulating means and means for connecting the control electrode of said second controlled rectifier to the second terminal of said state of conduction regulating means.

2. A frequency conversion system in accordance with claim 1 wherein said state of conduction regulating means comprises first and second groups of identical circuit blocks, each group comprising a square wave generator, a current sink and ramp function generator, a mixer amplifier, a first blocking oscillator, a low frequency switch, and a second blocking oscillator, means for connecting the first terminal of said alternating-current source to the said first group, means for connecting the second terminal of said alternating-current source to said second group, means for serially connecting said square wave generator, said current sink and ramp function generator, said mixer amplifier, said first blocking oscillator, said low frequency switch and said second blocking oscillator in each of said first and second groups, means for connecting the first and second terminals of said regulating means to the respective outputs of said second blocking oscillators in each of said first and second groups, respectively, a differential feedback amplifier, an oscillator, the frequency of said oscillator being lower than the frequency of said alternating-current source, means for connecting said feedback amplifier to said load, said oscillator and said mixer amplifiers and means for connecting said oscillator to said low frequency switches.

3. A regulated solid-state frequency conversion system comprising first and second bistable devices having conductive and substantially nonconductive states and input, output and control electrodes, a source of input frequency connected to the input electrodes of each of said first and second bistable devices, a load connected to the output electrodes of each of said first and second bistable devices, a source of reference frequency having the desired load frequency and waveform output, control means connected to said input and reference sources and the control electrodes of each of said bistable devices to control the states of conduction of said bistable devices, feedback means responsive to load frequency waveform and voltage variations connected to said load, said reference frequency source and said control means whereby feedback controlled frequency and waveform conversion and voltage regulation is obtained.

4. A conversion system in accordance with claim 3 wherein said control means comprises first and second identical groups of circuit blocks, each of said groups comprising a square wave generator, a ramp function generator, a mixer amplifier, and an electronic switch, means for serially connecting in each of said first and second groups of identical blocks said input source of frequency, said square wave generator, said ramp function generator, said mixer amplifier and said electronic switch, said feedback means being connected to the mixer amplifiers in each of said first and second groups, and said reference source being connected to the electronic switches in each of said first and second groups whereby said first and second bistable devices are rendered alternately conducting.

5. A solid-state frequency conversion system comprising a source of input frequency, a load, first and second semiconductor controlled rectifiers having anode, cathode and gate electrodes, said anode electrodes of said controlled rectifiers being connected to said source of input frequency while said cathode electrodes are connected to said load, a source of reference frequency having the desired load frequency, control means connected to said reference source, said load and said gate electrodes of said controlled rectifiers to alternately initiate conduction in each of said controlled rectifiers in accordance with said reference source and load voltage variations, first and second energy storage elements interconnecting the anode and cathode electrodes of each of said first and second control rectifiers respectively, and means connected to said first and second energy storage elements to charge each of said first and second energy storage elements to a potential at least half the inverse potential necessary to terminate conduction in said controlled rectifiers whereby the potential stored in each of said first and second energy storage elements is applied as a reverse potential to the conducting controlled rectifier upon initiation of conduction in the other controlled rectifier.

6. A solid-state frequency conversion system in accordance with claim 5 wherein said first and second energy storage elements are capacitors and first and second inductors are serially connected between the anode electrodes of each of said first and second controlled rectifiers and said source, respectively, to retard the discharge of the energy in said capacitors for an interval sufficient to allow the conducting controlled rectifier to be biased into the substantially nonconductive state.

References Cited by the Examiner

UNITED STATES PATENTS

| | | | |
|---|---|---|---|
| 1,871,904 | 8/1932 | Niles et al. | 321—70 |
| 2,573,137 | 10/1951 | Greer | 321—66 |
| 2,899,566 | 8/1959 | Ware et al. | 321—61 |
| 2,929,011 | 3/1960 | Parsons | 321—66 |
| 2,967,252 | 1/1961 | Blake | 321—61 |
| 2,995,696 | 8/1961 | Stratton et al. | 321—69 |
| 3,178,630 | 4/1965 | Jessee | 321—61 |

LLOYD McCOLLUM, *Primary Examiner.*

MILTON O. HIRSHFIELD, *Examiner.*

G. J. BUDOCK, G. GOLDBERG, *Assistant Examiners.*